US011587093B2

(12) United States Patent
Seshan et al.

(10) Patent No.: US 11,587,093 B2
(45) Date of Patent: Feb. 21, 2023

(54) OPTIMIZED DUNNING USING MACHINE-LEARNED MODEL

(71) Applicant: Stripe, Inc., San Francisco, CA (US)

(72) Inventors: Tara Seshan, San Francisco, CA (US); Adam Eagle, San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 416 days.

(21) Appl. No.: 16/794,844

(22) Filed: Feb. 19, 2020

(65) Prior Publication Data
US 2020/0327552 A1 Oct. 15, 2020

Related U.S. Application Data

(60) Provisional application No. 62/817,893, filed on Mar. 13, 2019.

(51) Int. Cl.
*G06Q 20/42* (2012.01)
*G06F 11/14* (2006.01)
*G06N 20/00* (2019.01)

(52) U.S. Cl.
CPC ....... *G06Q 20/425* (2013.01); *G06F 11/1405* (2013.01); *G06N 20/00* (2019.01)

(58) Field of Classification Search
CPC ............ G06Q 20/425; G06Q 20/4016; G06Q 20/4037; G06F 11/1405; G06F 11/1402; G06N 20/00
See application file for complete search history.

(56) References Cited

U.S. PATENT DOCUMENTS

| | | | | |
|---|---|---|---|---|
| 10,839,394 | B2* | 11/2020 | Jia | .......................... G06N 20/00 |
| 2005/0075979 | A1* | 4/2005 | Leavitt | ..................... G07G 5/00 |
| | | | | 705/40 |
| 2014/0337188 | A1* | 11/2014 | Bennett | ................ G06Q 20/102 |
| | | | | 705/40 |
| 2019/0197550 | A1* | 6/2019 | Sharma | .............. G06Q 20/4016 |
| 2019/0392428 | A1* | 12/2019 | Bolla | ..................... G06Q 20/14 |

OTHER PUBLICATIONS https://www.adyen.com/dam/jcr:fa22dbfc-6380-4b55-91d8-33cc2c15f522/7be2b1a7-8d27-4d6e-8305-ce06239f2ea6.pdf (Year: 2017).*
https://www.paysafe.com/fileadmin/user_upload/Platform_Portal/Paysafe_FAQs_for_Merchants_Final_December_2018.pdf (Year: 2018).*
https://www.rebilly.com/guides/retry-strategy.pdf (Year: 2018).*

* cited by examiner

*Primary Examiner* — Patrick McAtee
*Assistant Examiner* — Vincent I Idiake
(74) *Attorney, Agent, or Firm* — Schwegman Lundberg & Woessner, P.A.

(57) ABSTRACT

In an example embodiment, information about one or more failed payment attempts via an electronic payment processing system is obtained. One or more features are extracted from the information. Then, for each of a plurality of potential candidate retry time points, the one or more features and the potential candidate retry time point are fed into a dunning model, the dunning model trained via a machine-learning algorithm to produce a dunning score indicative of a likelihood that a retry attempt at an input retry time point will result in a successful payment processing. The dunning scores for the plurality of potential candidate retry time points are used to select a desired retry time point. Then the electronic payment processing system is caused to attempt to reprocess a payment associated with one of the failed payment attempts at a time matching the desired retry time point.

17 Claims, 8 Drawing Sheets

OPTIMIZED DUNNING USING MACHINE-LEARNED MODEL

CROSS-REFERENCE TO RELATED APPLICATION

This application is a Non-Provisional of and claims the benefit of priority under 35 U.S.C. § 119(e) from U.S. Provisional Application Ser. No. 62/817,893, entitled "OPTIMIZED DUNNING USING MACHINE-LEARNED MODEL," filed on Mar. 13, 2019 which is hereby incorporated by reference herein in its entirety.

TECHNICAL FIELD

The subject matter disclosed herein generally relates to the technical field of special-purpose machines programmed with a machine-learned model that facilitate adding new features to a payment processor. The subject matter also relates to an improved payment processor that implements such new features, and includes software-configured computerized variants of such special-purpose machines and improvements to such variants, and to the technologies by which such special-purpose machines become improved compared to other special-purpose machines that facilitate adding the new features.

In one aspect, an improved payment processor can perform optimized dunning using the machine-learned model.

BACKGROUND

The present subject matter seeks to address technical problems existing in conventional payment processors. For example, while payment processors seek to provide merchants with an easy and efficient mechanism for collecting payments from customers, collecting such payments may present difficulties for various reasons. One such difficulty involves payments that do not process for some reason. For example, a recurring credit card charge may be attempted to be billed on a particular day and time each month, but it may turn out that the processing of the payment may be rejected because, for example, the user has an insufficient credit limit left on the card, or the card has expired, or the credit card company's fraud protection has denied the charge. It can be difficult to determine whether these rejections or other non-completions of the payments are due to temporary reasons (whether the above examples or even just technical difficulties in the communications during the processing) or permanent reasons.

Under the assumption that the problems in processing a charge may be temporary, a merchant may attempt to retry processing of the charge at a later time. This retry process is known as "dunning." A charge may be unsuccessful now, but successful later, due to a change in circumstance (e.g., customer updating card details, issuing a new card, freeing of credit limit, increase in credit limit, different mode of processing, etc.).

While a merchant may be tempted to simply keep trying to process the charge over and over at brief intervals (e.g., trying every minute for a month), practical considerations make this impossible. For protection, most credit card companies limit the number of retries for a single charge (such as a maximum of six retries).

BRIEF DESCRIPTION OF THE DRAWINGS

Some embodiments are illustrated by way of example and not limitation in the figures of the accompanying drawings.

In order to identify more easily the discussion of any particular element or act, the most significant digit or digits in a reference number refer to the figure number in which that element is first introduced.

DETAILED DESCRIPTION

As mentioned above, while it would be desirable that every time a payment is processed the processing would be successful, that is not always the case. Technical problems, such as service interruptions, can cause a payment to fail. Such technical interruptions can be caused, for example, by the service itself, by network connectivity issues (e.g., DNS routing problems, server crash, malware), or because of the temporary unavailability of a third party upon which the payment processor relies. Non-technical problems can also cause a payment to fail, most commonly because of a rejection of the payment by a credit card company or other card provider. Reasons for such a rejection may include, for example, an insufficient credit limit or funds to cover the charge, suspected fraud, outdated or otherwise incorrect card information, and the like. Regardless of the reasons for the failure in processing of the charge, it is desirable for the charge to be retried at a later time though dunning.

Given the limits imposed on the number of retries permitted, it would be beneficial to have a mechanism to perform the retries at the days and times that are most likely to result in a successful reprocessing of the charge. In other words, it would be beneficial to have an automatic mechanism that maximized the likelihood of a successful reprocessing of a charge by using the parameters most likely to result in success.

Figure 1:
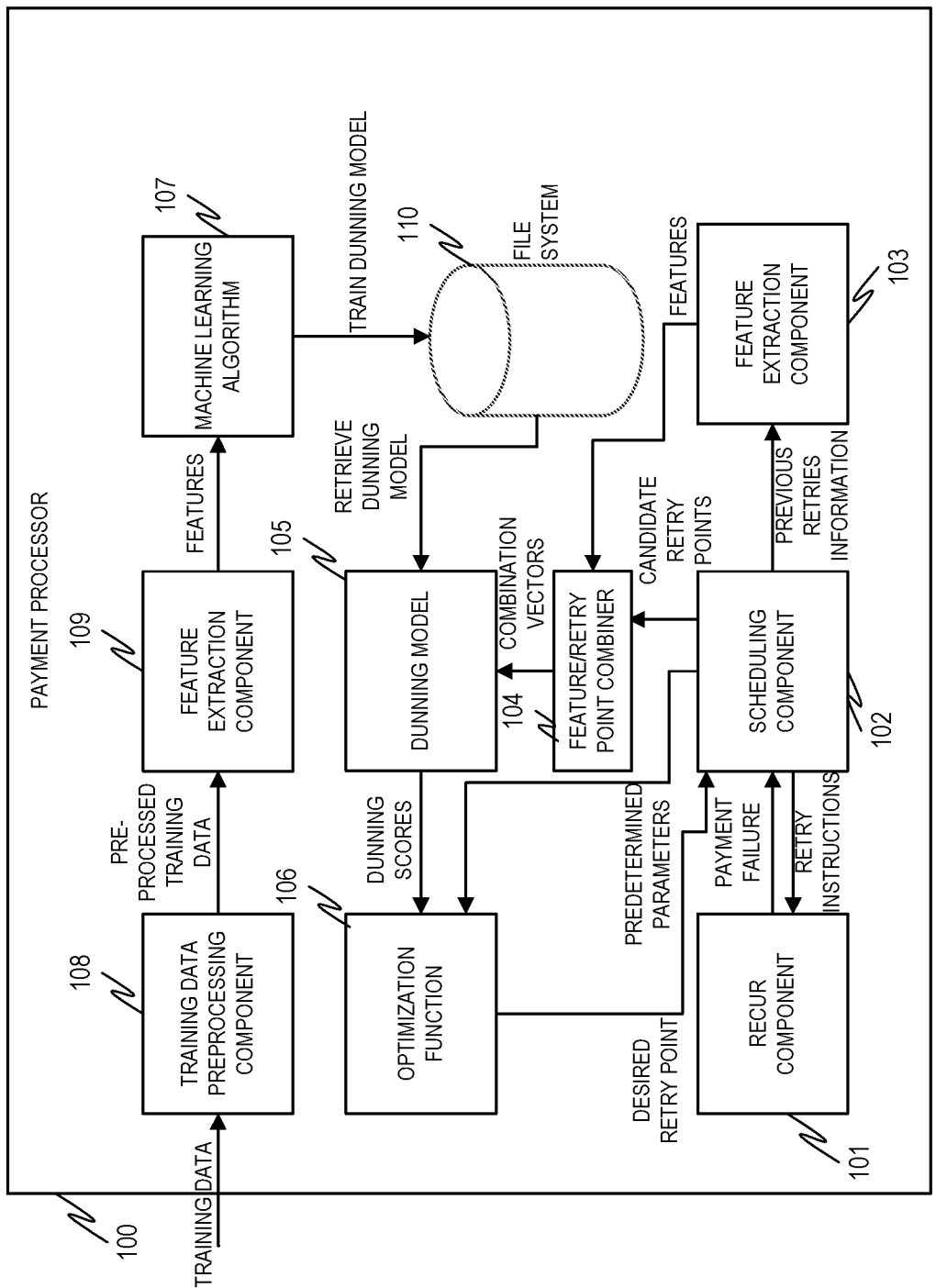
FIG. 1 is a block diagram illustrating an example payment processor in accordance with an example embodiment.

FIG. 1 is a block diagram illustrating an example payment processor 100, in accordance with an example embodiment. Here, the example payment processor 100 includes a recur component 101. The recur component 101 acts to process and reprocess recurring payments. Occasionally, the processing of such payments will fail. Each failed payment may be passed to a scheduling component 102. This scheduling component 102 acts to schedule (and reschedule, as will be seen in more detail below) retries of failed payments.

Specifically, details about the failed payment (and any other previous retry attempts for the failed payment) may be passed to a feature extraction component 103, which acts to extract one or more features from this information. A feature/retry point combiner 104 then takes these features and combines them with retry points in various different combination vectors. These combination vectors can then be passed to a dunning model 105. In an example embodiment, these combination vectors are passed to the dunning model 105 one at a time, and the dunning model 105 produces a dunning score for each combination vector one at a time.

In an example embodiment, the dunning score is optimized at evaluation time in accordance with an optimization function 106. This optimization function 106 acts to optimize the dunning score in a manner so that the output of the dunning model 105 not only maximizes the chances that a payment will be processed successfully but also minimizes the distance between the retry points and points at predetermined intervals. These intervals may be determined based on a specified maximum number of retries and a specified preferred last retry date and may be passed to the optimization function 106 from the scheduling component 102. Thus, for example, for monthly recurring charges, it may be determined that the preferred last retry date for a particular initial failed payment will be 28 days after the initial failed payment. The maximum number of retries overall may be set at 4 (which would make a total of 5 charges maximum, including the initial failed payment). The result is that if the initial payment attempt was made at day 0, the final retry may be scheduled for day 28, and the intervals may be selected to distribute the remaining 3 retry points evenly between day 0 and day 28 (which would mean a retry point at days 7, 14, and 21). These selected retry points, it should be noted, are merely initial suggestions, as the actual retry points suggested by the optimization function 106 will be based on maximizing the dunning score while minimizing the distance to the selected retry points.

The output of the optimization function 106 is a desired retry point. The desired retry point may be passed to the scheduling component 102, which may produce retry instructions for the recur component 101 instructing it on when to attempt to retry the payment processing.

It should also be noted that while the above example of a retry point is expressed in terms of overall days since the initial processing, in an example embodiment, the retry points output by the optimization function 106 may be more precise, specifying the retry points at a lower level of granularity than days, such as hours, minutes, or even seconds. This is because time of day may be a factor that the dunning model 105 considers when evaluating the dunning score, as it is possible that, for example, a payment is more likely to be successfully processed in the early morning than in the evening.

Thus, in practice, the evaluation of an individual candidate retry point may be performed using a simulation technique. In the simulation technique, all features for the first failed attempt are computed (such as by using data in a first failed attempt section of data for the initial charge). Then, attempting to charge the card N hours after the first attempt is simulated, and all features in a new timing section are computed based on this simulated attempt. The joint features may then be sent to the dunning model 105, with the probability of getting a successful payment being output and stored. This process may then be repeated for all reasonable values of N.

Then, for each of these values of N, the optimization function 106 may be used to determine the desired retry point. Once this desired retry point is determined, the recur component 101 may attempt to retry the processing of the payment at that desired retry point. If the retry attempt is successful, then the process is complete. If not, then the above process may be repeated to determine the next retry attempt. Here, information about the previous retry attempt may be used as additional features by the dunning model 105. Thus, for example, while the initial payment attempt may have failed due to a particular failure code, the retry attempt may have failed due to a different failure code, which may then affect the dunning scores for potential future retry attempts. As such, the dunning scores may be recalculated for each of the potential retry points that are later than the previous retry attempt, and the rest of the process may be repeated as well.

While in some example embodiments the retry instructions may include a complete schedule of a plurality of retries, in some example embodiments, the schedule may include only a single retry, with the scheduling component 102 submitting separate details of a failure of this single retry to the dunning model 105 to obtain another scheduled time for another retry. This allows the timing of each retry attempt to dynamically take into account details about the previous retry attempt (and its subsequent failure) instead of establishing a static schedule after the initial payment failure.

The dunning model 105 may be trained via a machine-learning algorithm 107. Specifically, training data may be obtained from a data source (not pictured). In some example embodiments, the training data is initially stored in a Hadoop cluster and comprises information on previous attempted retries of payments from various customers and merchants. To the extent available, this training data can also include information on the customers and merchants themselves, such as, for example, their respective locations, merchant classifications, previous payment histories, and the like.

In an example embodiment, the training data may comprise only information from payment attempts that result in dunning attempts. In a further example embodiment, each piece of training data may contain two sections—a first failed attempt section and a new timing section—as well as a label indicating whether the dunning attempt succeeded. The first failed attempt section contains any attributes relevant to the initial charge attempt. The new timing section contains any attribute dependent on the new timing of the dunning attempt following the first attempt.

A training data preprocessing component 108 may preprocess the training data, including, for example, applying a MapReduce function or similar functionality on the training data. A feature extraction component 109 may then act to extract a plurality of features from the preprocessed training data and feed these features into a machine-learning algorithm 107. The machine-learning algorithm 107 learns weights assigned to each of the features and applies these weights to a function. The function and the learned weights comprise the machine-learned dunning model 105, which may be stored in a file system 110 and retrieved when needed to perform analysis of a candidate failed payment at various potential candidate times.

The machine-learning algorithm 107 may be selected from among many different potential supervised or unsupervised machine-learning algorithms. Examples of supervised machine-learning algorithms include artificial neural networks, Bayesian networks, instance-based learning, support vector machines, random forests, linear classifiers, quadratic classifiers, k-nearest neighbor, decision trees, and hidden Markov models. Examples of unsupervised machine-learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors). In a further example embodiment, a boosted tree gradient descent process is utilized for the machine learning.

The function contained in the dunning model 105 may be evaluated at runtime to produce a dunning score. The dunning score is a prediction of the likelihood that a retry attempt on a failed payment will result in a successful payment, based on evaluation of various features and applying the feature weights learned by the machine-learning algorithm 107 to the features.

In some example embodiments, the feature extraction component 109 extracts the same features as the feature extraction component 103, but the features may be different in other example embodiments. Examples of features extracted from the preprocessed training data and used by the machine-learning algorithm 107 in training the weights include, but are not limited to, hours since the last attempt, days until expiration, number of tries, hours since customer creation, dollar amount of the payment, whether the decline is due to insufficient funds, whether the decline requests a pickup of the card (usually due to the card having been reported stolen or having expired), whether the card is a prepaid card, hours since the first attempt, whether the decline says the transaction is not allowed, day of the month, day of the week, whether the decline says that the transaction should not be tried again, country of the card, validator of the card, whether the decline indicates a lost card, hours between the first and last attempts, last attempted day of the week, and whether the card is a debit card. Other features may include merchant-specific features (e.g., the class of merchant, which usually indicates the industry of the merchant, such as restaurant, movie theater, etc.) and purchaser-specific features (e.g., location of purchaser, payment history, etc.).

In an example embodiment, the features may include aggregates of historical data. This historical data may include, for example, how many successful charges have been made in the last hour, day, week, etc. Additional features in this historical data may include, for example, tracking successful charges by customer email, Internet Protocol (IP) address, percentages of successful charges, etc. Thus, these features may include non-negative data (data about successful charges) as opposed to merely negative data (data about unsuccessful charges).

It should be noted that while the discussion above describes the machine-learning algorithm 107 training the dunning model 105 to optimize the probability of a successful payment by changing the timing of the retry, other parameters of a retry could be altered in lieu of or in addition to the timing of the retry. For example, similar techniques may be used to optimize the method by which the retry is attempted (e.g., the form or channel in which a communication to attempt a retry is performed, such as selecting an email attempt rather than a text message attempt), or the type of payment attempted (if there are multiple choices of payments available).

Figure 2:
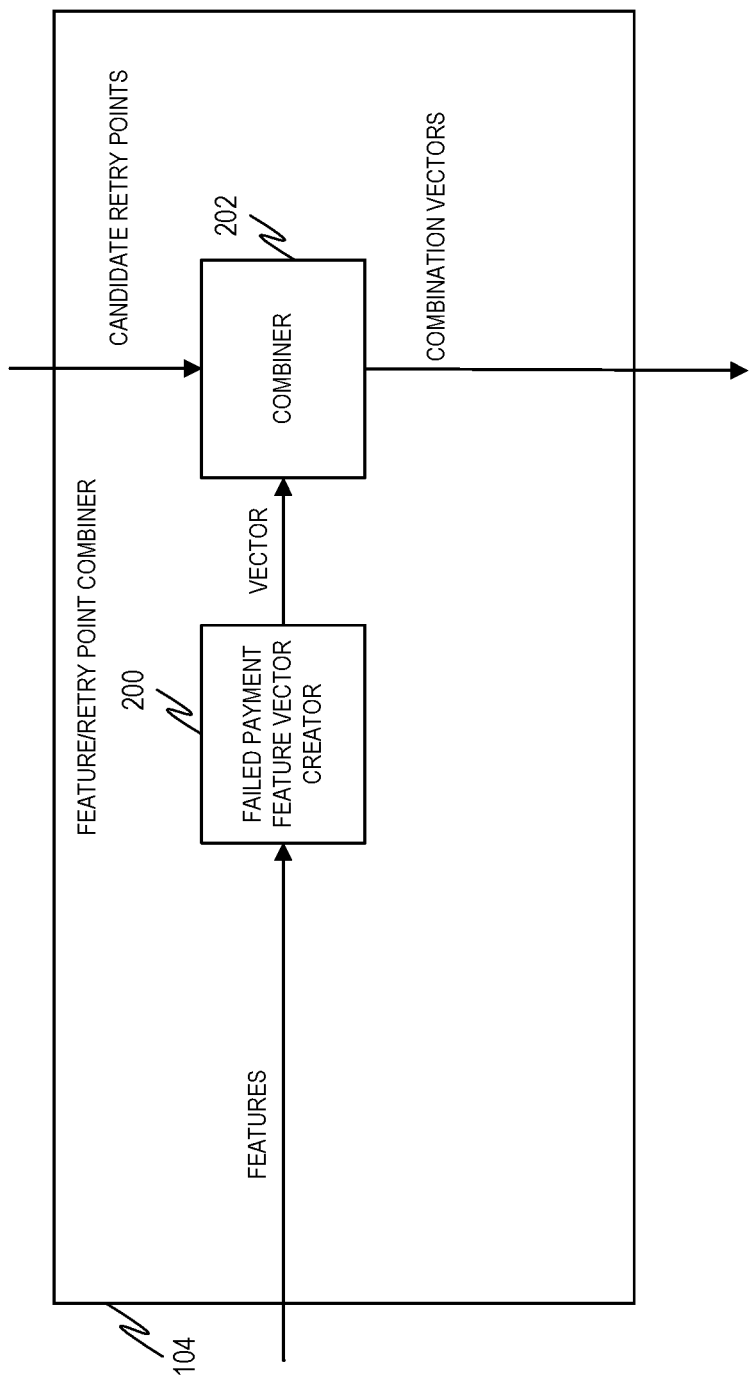
FIG. 2 is a block diagram illustrating a feature/retry point combiner of FIG. 1 in more detail, in accordance with an example embodiment.

FIG. 2 is a block diagram illustrating the feature/retry point combiner 104 of FIG. 1 in more detail. Here, a failed payment feature vector creator 200 creates a feature vector that combines all the features of all the failed payments for a buyer received from the feature extraction component 103. A combiner 202 then combines this feature vector with each candidate retry point to create a different combination vector for each candidate retry point. These combination vectors can then be passed to the dunning model 105.

Figure 3:
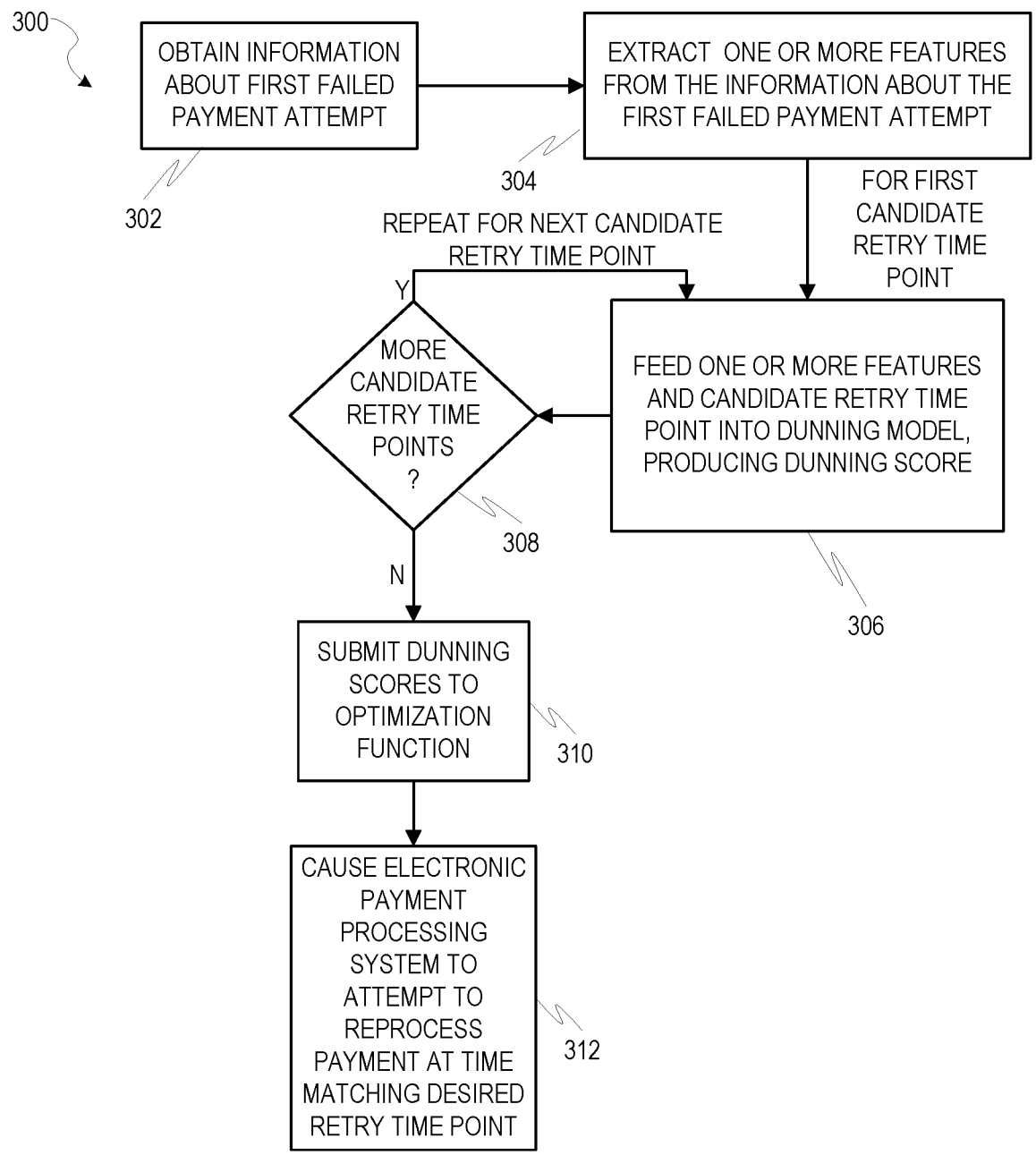
FIG. 3 is a block diagram showing aspects of an online method for reprocessing a payment after a first failed payment attempt via an electronic payment processing system, according to an example embodiment.

FIG. 3 is a flow diagram illustrating a method 300, for reprocessing a payment after a first failed payment attempt via an electronic payment processing system, in accordance with an example embodiment. At operation 302, information about the first failed payment attempt via the electronic payment processing system is obtained. This may be obtained, for example, from a Hadoop system. At operation 304, one or more features are extracted from the information about the first failed payment attempt. Then a loop is begun for each of a plurality of potential candidate retry time points. At operation 306, the one or more features and the candidate retry time point are fed into a dunning model, the dunning model trained via a machine-learning algorithm to produce a dunning score indicative of a likelihood that a retry attempt at an input retry time point will result in a successful payment processing. At operation 308, it is determined if there are any more potential candidate retry time points to attempt. If so, then the method 300 loops back to operation 306 for the next candidate retry time point.

If not, then at operation 310, the dunning scores for the plurality of potential candidate retry time points are submitted to an optimization function, the optimization function designed to identify a potential candidate retry time point having a maximum dunning score while minimizing a distance between the potential candidate retry time point and a predetermined time point selected based on a predetermined interval, resulting in a desired retry time point.

At operation 312, the electronic payment processing system is caused to attempt to reprocess a payment associated with the first failed payment attempt at a time matching the desired retry time point.

It should be noted that while the discussion above describes using the dunning model to identify a retry point to reprocess a failed payment, similar techniques can be used to identify when to attempt a first payment of a particular invoice (i.e., where there has not yet been a failed payment attempt). The features in this case would not include features of failed payments that need to be reprocessed (i.e., past failed payments on the invoice), but could include features of other failed payments (if any) made by the same buyer, or other features of the buyer and/or merchant.

It should also be noted that the above techniques are described as being performed by the payment processor; however, some or all of the operations may be performed by a different entity, such as by the merchant itself (using, for example, a JavaScript library of functions provided by the payment processor).

In some embodiments, a JavaScript library can be embedded into a merchant's checkout form to handle credit card information. When a user attempts to complete a transaction using the checkout form, it sends the credit card information directly from the user's browser to the payment processor's servers. The JavaScript library provides merchants with a set of technologies that can be easily and quickly integrated to securely accept payments online. With the JavaScript library, merchants retain full control of their customers' payment flows, but their servers are never exposed to sensitive payment information.

When added to a merchant's payment form, the JavaScript library automatically intercepts the payment form submission, sending payment information directly to the payment processor and converting it to a token. The token can be safely passed to the merchant's systems and used later to charge customers. Merchants have complete control of their customers' payment experience without ever handling, processing, or storing sensitive payment information.

Figure 4:
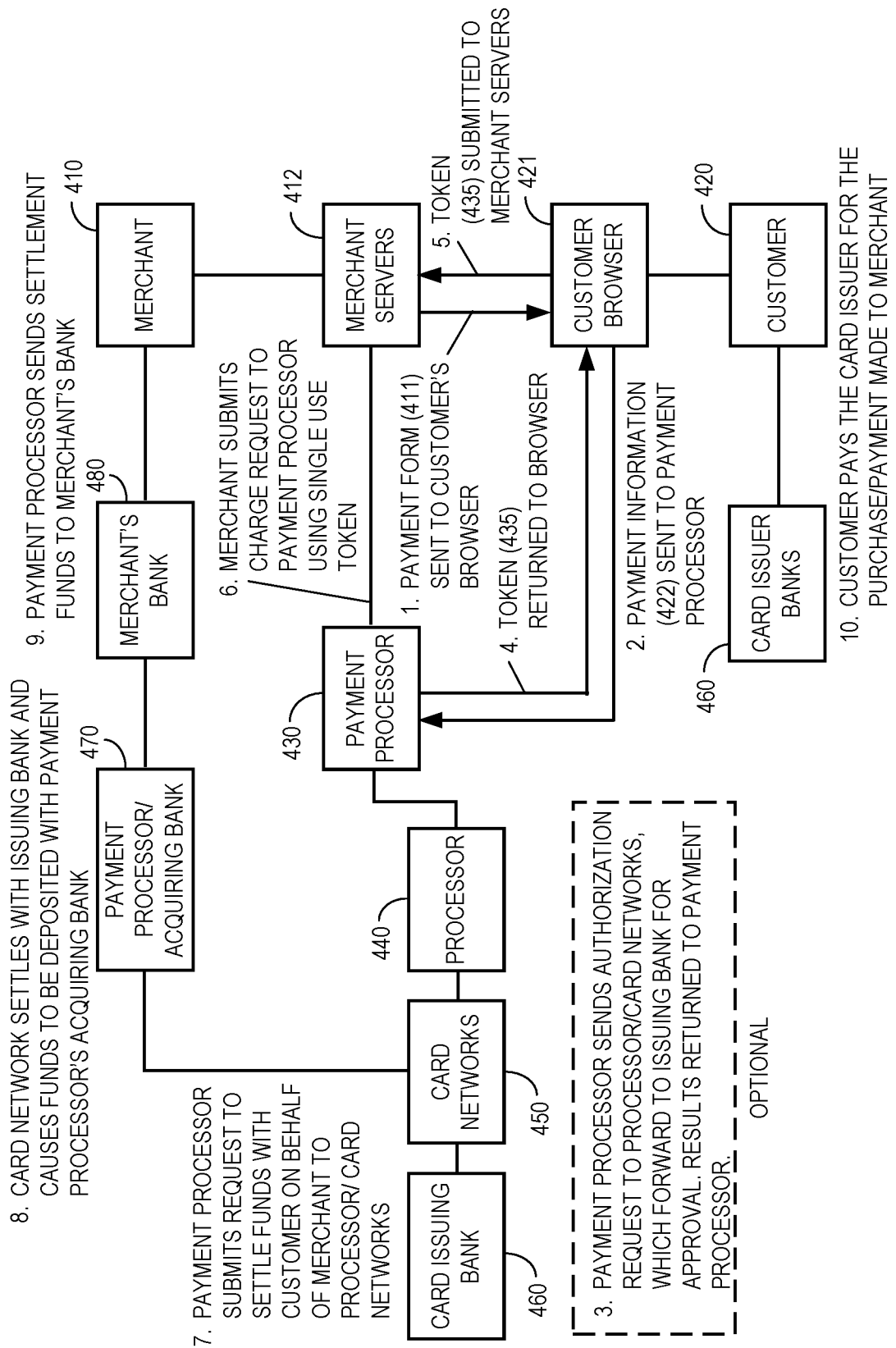
FIG. 4 is a flow diagram illustrating a method for conducting a transaction between a merchant site and an electronic user device using a payment processor, in accordance with an example embodiment.

Viewed broadly in one example, and with reference to FIG. 4, a payment processing flow is now described. This figure is one embodiment in which the dunning model 105 described above can be utilized.

1. The merchant's customer (420) uses an Internet-enabled browser (421) to visit the merchant's site. The customer (420) is served a JavaScript library-enabled payment form (411) using standard web technologies. The customer (420) enters the specified information including their payment information (422) and submits the payment form (411). The billing info portion of the payment form (411) is for payment via a credit card or debit card. If payment is to be made via an Automated Clearing House (ACH) transaction, the billing info portion of the payment form (411) will request a bank routing number and an account number within that bank, and possibly additional information, such as the bank name and whether the account is a checking or savings account.

2. The customer's payment information (422) is sent from the customer's browser (421) to the payment processor (430), never touching the merchant servers (412). In this manner, the client-side application electronically sends payment information retrieved from the customer's electronic device to the payment processor (430). The client-side application does not send the payment information (422) to the server-side application.

3. In one preferred embodiment, the payment processor (430) submits the relevant transaction to a processor (440) or directly to a card network (450) for authorization or validation of the payment information. The card network (450) sends the request to a card issuing bank (460), which authorizes the transaction. In this embodiment, the payment processor (430) and the processor (440)/card network (450) function together as a payment processor. In another example embodiment, this step is performed without any communication to the processor (440)/card network (450). Instead, the payment processor (430) performs its own authorization or validation of the payment information using heuristic means, such as by checking the Bank Identification Number (BIN), also referred to as the Issuer Identification Number (IIN), against a database of known, valid BINS on file with the payment processor (430). (The BIN is a part of the bank card number, namely the first six digits.) In yet another example embodiment, this step is not performed at all since the authorization or validation is not necessary for the next step (4) to succeed. That is, it is acceptable to create a token in step (4) that represents payment information which has not been validated in any way.

4. If authorized, the payment processor (430) will generate and return a secure token (435) to the customer's browser (421) that represents the customer's payment information but doesn't leak any sensitive information. In the example embodiment wherein step (3) is not performed, the payment processor (430) performs this step without waiting to receive authorization from the processor (440) or the card network (450). In this manner, the payment processor (430) creates the token (435) from the payment information sent by the client-side application, wherein the token (435) functions as a proxy for the payment information (422).

5. The payment form (411) is submitted to the merchant servers (412), including the token (435). More specifically, the payment processor (430) sends the token (435) to the client-side application, which, in turn, sends the token (435) to the server-side application for use by the server-side application in conducting the transaction.

6. A merchant (410) uses the token (435) to submit a charge request to the payment processor (430) (or to create a customer object for later use). In this step, the payment processor (430) submits a request to authorize the charge to the processor (440) or directly to the card network (450). This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (a so-called "card on file" scenario). Using the process described in steps (1) through (6), the payment information can be used by the server-side application via the token (435) without the server-side application being exposed to the payment information.

7. The payment processor (430) settles the charge on behalf of the merchant (410) with the processor (440) or directly with the card network (450).

8. The card network (450) causes the funds to be paid by the card issuing bank (460) to the payment processor (430) or to the payment processor's acquiring bank (470).

9. The payment processor (430) causes the settled funds to be sent to the merchant (410) (or to the merchant's bank (480)), net of any applicable fees.

10. The card issuing bank (460) collects the paid funds from the customer (420).

Not all of the steps listed above need happen in real time. Other examples, arrangements, and functionality are possible. Applicant's published patent application US 2013/0117185 A1 is incorporated by reference in its entirety in this regard. Typically, when the merchant's customer submits the payment form in step (1), steps (1) through (6) happen in real time and steps (7) through (10) happen later, usually once per day, as a batch process settling all of the funds for all of the payment processor's merchants. In some examples, the payment processor uses an HTTP-based tokenization API in steps (2) and (4) above. Some broader examples may be considered "tokenization as a service," in which any data is tokenized. One general example may facilitate a merger and acquisition (M&A) analysis in which companies want to compare an overlap in their customer bases. A payment processor (acting as a tokenization service) can tokenize the customers of each company and compare the overlap without revealing confidential information to either party. Unique payment tokens can be adapted to enable and facilitate such a tokenization service.

"Carrier signal" in this context refers to any intangible medium that is capable of storing, encoding, or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client device" or "electronic device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's electronic device" or "electronic user device" in this context refers to a client device that the customer uses to interact with the merchant. Examples of this device include a desktop computer, a laptop computer, a mobile device (e.g., smartphone, tablet), and a game console. The customer's electronic device may interact with the merchant via a browser application that executes on the customer's electronic device or via a native app installed onto the customer's electronic device. The client-side application executes on the customer's electronic device.

"Communications network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and any coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-readable medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

In another context, a "processor" (e.g., the processor (440) in FIG. 4) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card network" (or "card association") in this context refers to financial payment networks such as Visa®, MasterCard®, American Express®, Diners Club®, JCB®, and China Union-Pay®.

"Acquiring bank" or "acquirer" in this context refers to a bank or financial institution that accepts credit and/or debit card payments from affiliated card networks for products or services on behalf of a merchant or payment service provider.

"Card issuing bank" or "issuing bank" in this context refers to a bank that offers card network or association branded payment cards directly to consumers. An issuing bank assumes primary liability for the consumer's capacity to pay off debts they incur with their card.

"Payment information" includes information required to complete a transaction, and the specific type of information provided may vary by payment type. Some payment information will be sensitive (e.g., the card validation code) while other information might not be (e.g., zip code). For example, when a payment is made via a credit card or debit card, the payment information includes a primary account number (PAN) or credit card number, card validation code, and expiration month and year. In another payment example, made using an Automated Clearing House (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "payment information" includes "sensitive information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant site" in this context refers to an e-commerce site or portal (e.g., website, or mobile app) of the merchant. In some embodiments, the merchant (410) and merchant servers (412) are associated with the merchant site. The merchant site is associated with a client-side application and a server-side application. In one example embodiment, the merchant site includes the merchant servers (412) in FIG. 4, and the server-side application executes on the merchant servers (412).

"Payment processor" in this context (e.g., the payment processor (430) in FIG. 4) refers to an entity or a plurality of entities that facilitate a transaction, for example between a merchant and a customer's electronic device. With reference to the high-level description illustrated in FIG. 4, in some examples described more fully below, the payment processor includes selected functionality of both the payment processor (430) and the processor (440)/card networks (450). For example, the payment processor (430) creates tokens and maintains and verifies publishable (non-secret) keys and secret keys. In the illustrated example, the processor (440)/card networks (450) are involved in authorizing or validating payment information. In one example embodiment, the payment processor (430) and the processor (440)/card networks (450) function together to authorize and validate payment information, issue a token, and settle any charges that are made. Accordingly, in this embodiment, "payment processor" refers to the functionality of the payment processor (430) and the functionality of the processor (440)/card networks (450). In another example embodiment, wherein step (3) in the high-level description is not performed, and the payment processor (430) performs its own verification before issuing a token, the processor (440)/card networks (450) are still used for settling any charges that are made, as described in step (7). Accordingly, in this embodiment, "payment processor" may refer only to the functionality of the payment processor (430) with respect to issuing tokens. Further, in the example arrangement shown, the payment processor (430), the processor (440), and the card networks (450) are shown as separate entities. In some examples, their respective functions may be performed by two entities, or even just one entity, with the entities themselves being configured accordingly.

"Native application" or "native app" in this context refers to an app commonly used with a mobile device, such as a smartphone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which requires interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings forming a part of this document: Copyright 2011-2018, Stripe, Inc., All Rights Reserved.

The preceding description that follows includes systems, methods, techniques, instruction sequences, and computing machine program products that embody illustrative embodiments of the disclosure. In the previous description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 5:
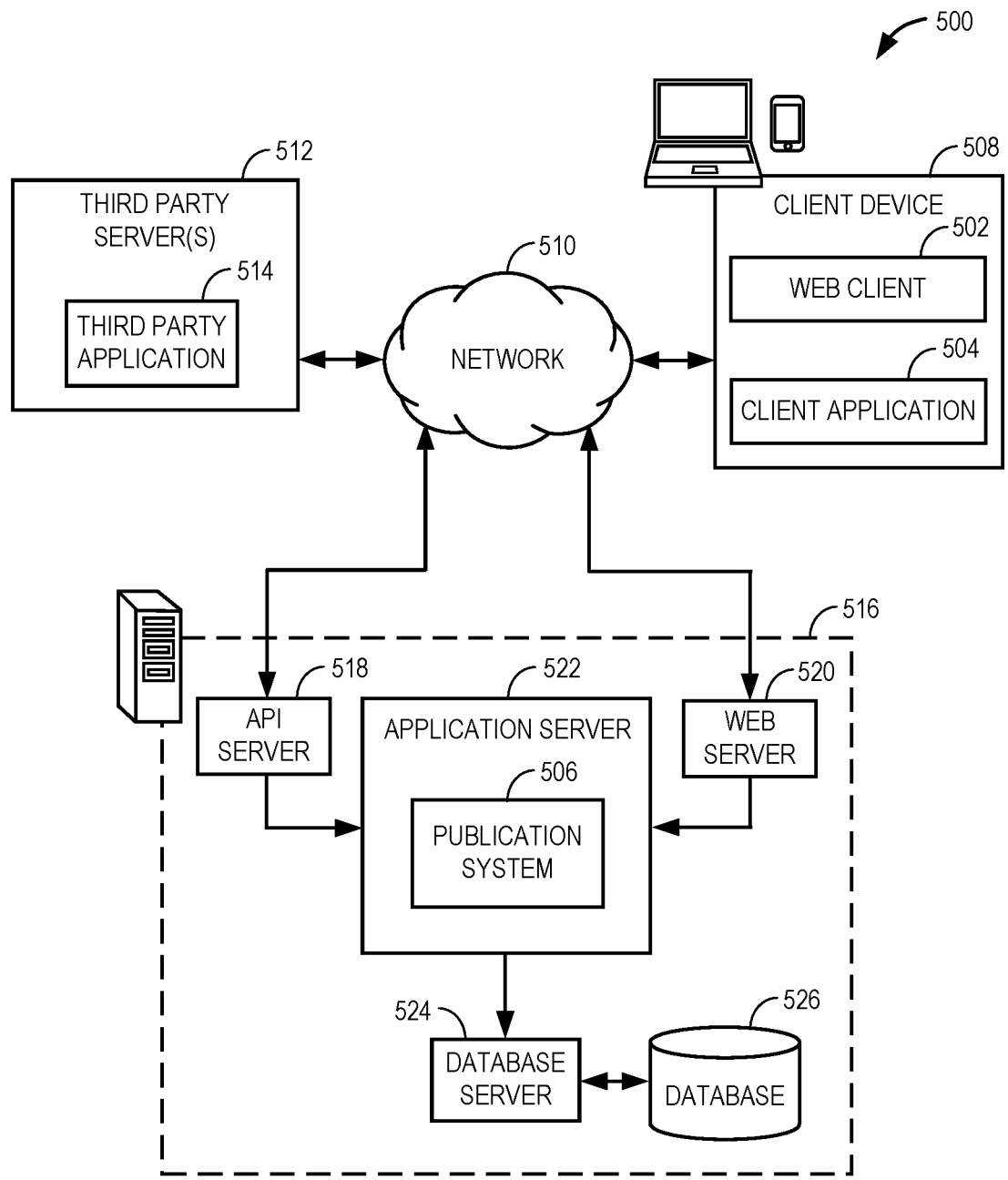
FIG. 5 is a block diagram illustrating a networked system, according to an example embodiment.

With reference to FIG. 5, an example embodiment of a high-level SaaS network architecture 500 is shown. A networked system 516 provides server-side functionality via a network 510 (e.g., the Internet or a WAN) to a client device 508. A web client 502 and a programmatic client, in the example form of a client application 504, are hosted and execute on the client device 508. The networked system 516 includes an application server 522, which in turn hosts a publication system 506 (such as the publication system hosted at https://stripe.com by Stripe, Inc., of San Francisco, Calif. (herein "Stripe"), as an example of a payment processor) that provides a number of functions and services to the client application 504 that accesses the networked system 516. The client application 504 also provides a number of interfaces described herein, which present output of the scheduling operations to a user of the client device 508.

The client device 508 enables a user to access and interact with the networked system 516 and, ultimately, the publication system 506. For instance, the user provides input (e.g., touch screen input or alphanumeric input) to the client device 508, and the input is communicated to the networked system 516 via the network 510. In this instance, the networked system 516, in response to receiving the input from the user, communicates information back to the client device 508 via the network 510 to be presented to the user.

An API server 518 and a web server 520 are coupled, and provide programmatic and web interfaces respectively, to the application server 522. The application server 522 hosts the publication system 506, which includes components or applications described further below. The application server 522 is, in turn, shown to be coupled to a database server 524 that facilitates access to information storage repositories (e.g., a database 526). In an example embodiment, the database 526 includes storage devices that store information accessed and generated by the publication system 506.

Additionally, a third-party application 514, executing on one or more third-party servers 512, is shown as having programmatic access to the networked system 516 via the programmatic interface provided by the API server 518. For example, the third-party application 514, using information retrieved from the networked system 516, may support one or more features or functions on a web site hosted by a third party.

Turning now specifically to the applications hosted by the client device 508, the web client 502 may access the various systems (e.g., the publication system 506) via the web interface supported by the web server 520. Similarly, the client application 504 (e.g., an "app" such as a payment processor app) accesses the various services and functions provided by the publication system 506 via the programmatic interface provided by the API server 518. The client application 504 may be, for example, an "app" executing on the client device 508, such as an IOS™ or ANDROID™ OS application to enable a user to access and input data on the networked system 516 in an offline manner and to perform batch-mode communications between the programmatic client application 504 and the networked system 516.

Further, while the SaaS network architecture 500 shown in FIG. 5 employs a client-server architecture, the present inventive subject matter is of course not limited to such an architecture, and could equally well find application in a distributed, or peer-to-peer, architecture system, for example. The publication system 506 could also be implemented as a standalone software program, which does not necessarily have networking capabilities.

Figure 6:
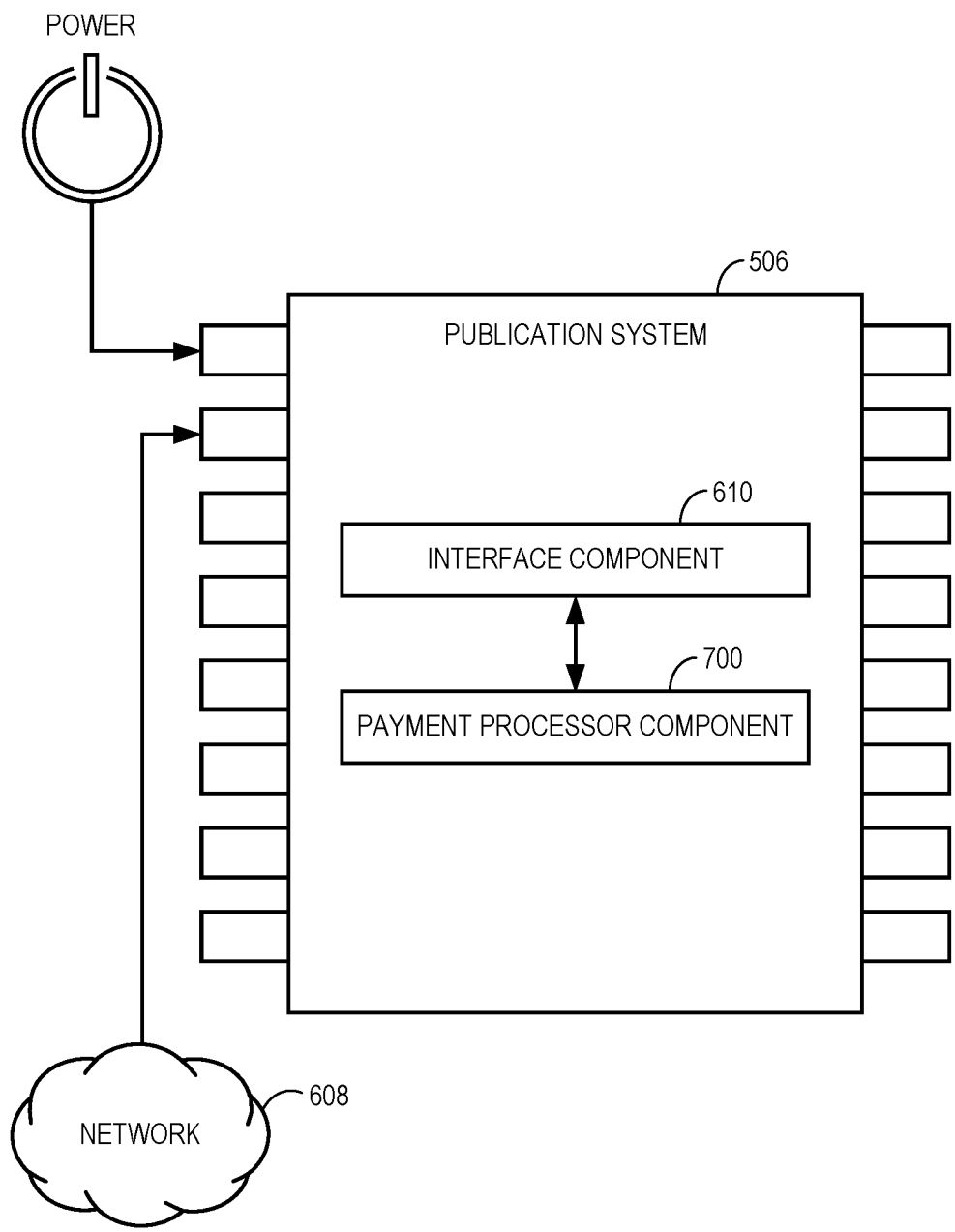
FIG. 6 is a block diagram showing architectural aspects of a publication system, according to some example embodiments.

FIG. 6 is a block diagram showing architectural details of a publication system 506, according to some example embodiments. Specifically, the publication system 506 is shown to include an interface component 610 by which the publication system 506 communicates (e.g., over a network 608) with other systems within the SaaS network architecture 500.

The interface component 610 is communicatively coupled to a payment processor component 700 that operates to provide optimized dunning functionality for a payment processor in accordance with the methods described herein with reference to the accompanying drawings.

Figure 7:
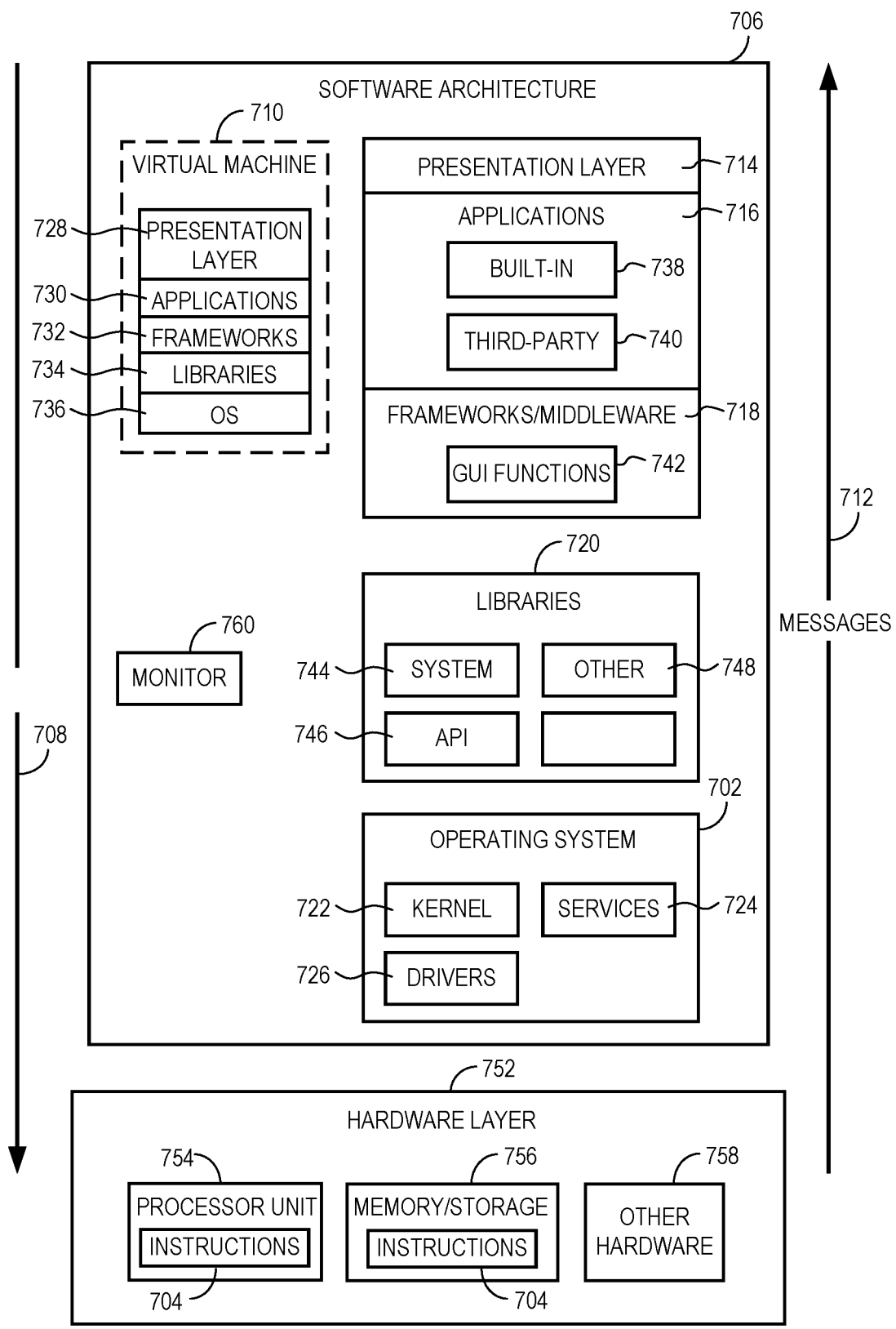
FIG. 7 is a block diagram illustrating a representative software architecture, which may be used in conjunction with various hardware architectures herein described.

FIG. 7 is a block diagram illustrating an example software architecture 706, which may be used in conjunction with various hardware architectures herein described. FIG. 7 is a non-limiting example of a software architecture 706, and it will be appreciated that many other architectures may be implemented to facilitate the functionality described herein. The software architecture 706 may execute on hardware such as a machine 800 of FIG. 8 that includes, among other things, processors 804, memory/storage 806, and input/output (I/O) components 818. A representative hardware layer 752 is illustrated and can represent, for example, the machine 800 of FIG. 8. The representative hardware layer 752 includes a processor 754 having associated executable instructions 704. The executable instructions 704 represent the executable instructions of the software architecture 706, including implementation of the methods, components, and so forth described herein. The hardware layer 752 also includes memory and/or storage modules as memory/storage 756, which also have the executable instructions 704. The hardware layer 752 may also comprise other hardware 758.

In the example architecture of FIG. 7, the software architecture 706 may be conceptualized as a stack of layers where each layer provides particular functionality. For example, the software architecture 706 may include layers such as an operating system 702, libraries 720, frameworks/middleware 718, applications 716, and a presentation layer 714. Operationally, the applications 716 and/or other components within the layers may invoke API calls 708 through the software stack and receive a response as messages 712 in response to the API calls 708. The layers illustrated are representative in nature, and not all software architectures have all layers. For example, some mobile or special-purpose operating systems may not provide a frameworks/middleware 718, while others may provide such a layer. Other software architectures may include additional or different layers.

The operating system 702 may manage hardware resources and provide common services. The operating system 702 may include, for example, a kernel 722, services 724, and drivers 726. The kernel 722 may act as an abstraction layer between the hardware and the other software layers. For example, the kernel 722 may be responsible for memory management, processor management (e.g., scheduling), component management, networking, security settings, and so on. The services 724 may provide other common services for the other software layers. The drivers 726 are responsible for controlling or interfacing with the underlying hardware. For instance, the drivers 726 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 720 provide a common infrastructure that is used by the applications 716 and/or other components and/or layers. The libraries 720 provide functionality that allows other software components to perform tasks in an easier fashion than by interfacing directly with the underlying operating system 702 functionality (e.g., kernel 722, services 724, and/or drivers 726). The libraries 720 may include system libraries 744 (e.g., C standard library) that may provide functions such as memory allocation functions, string manipulation functions, mathematical functions, and the like. In addition, the libraries 720 may include API libraries 746 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 720 may also include a wide variety of other libraries 748 to provide many other APIs to the applications 716 and other software components/modules.

The frameworks/middleware 718 provide a higher-level common infrastructure that may be used by the applications 716 and/or other software components/modules. For example, the frameworks/middleware 718 may provide various graphic user interface (GUI) functions 742, high-level resource management, high-level location services, and so forth. The frameworks/middleware 718 may provide a broad spectrum of other APIs that may be utilized by the applications 716 and/or other software components/modules, some of which may be specific to a particular operating system or platform.

The applications 716 include built-in applications 738 and/or third-party applications 740. Examples of representative built-in applications 738 may include, but are not limited to, a contacts application, a browser application, a book reader application, a location application, a media application, a messaging application, and/or a game application. The third-party applications 740 may include any application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 740 may invoke the API calls 708 provided by the mobile operating system (such as the operating system 702) to facilitate functionality described herein.

The applications 716 may use built-in operating system functions (e.g., kernel 722, services 724, and/or drivers 726), libraries 720, and frameworks/middleware 718 to create user interfaces to interact with users of the system. Alternatively, or additionally, in some systems, interactions with a user may occur through a presentation layer, such as the presentation layer 714. In these systems, the application/component "logic" can be separated from the aspects of the application/component that interact with a user.

Some software architectures use virtual machines. In the example of FIG. 7, this is illustrated by a virtual machine 710. The virtual machine 710 creates a software environment where applications/components can execute as if they were executing on a hardware machine (such as the machine 800 of FIG. 8, for example). The virtual machine 710 is hosted by a host operating system (the operating system 702 in FIG. 7) and typically, although not always, has a virtual machine monitor 760, which manages the operation of the virtual machine 710 as well as the interface with the host operating system (e.g., the operating system 702). A software architecture executes within the virtual machine 710 such as an operating system (OS) 736, libraries 734, frameworks 732, applications 730, and/or a presentation layer 728. These layers of software architecture executing within the virtual machine 710 can be the same as corresponding layers previously described or may be different.

Figure 8:
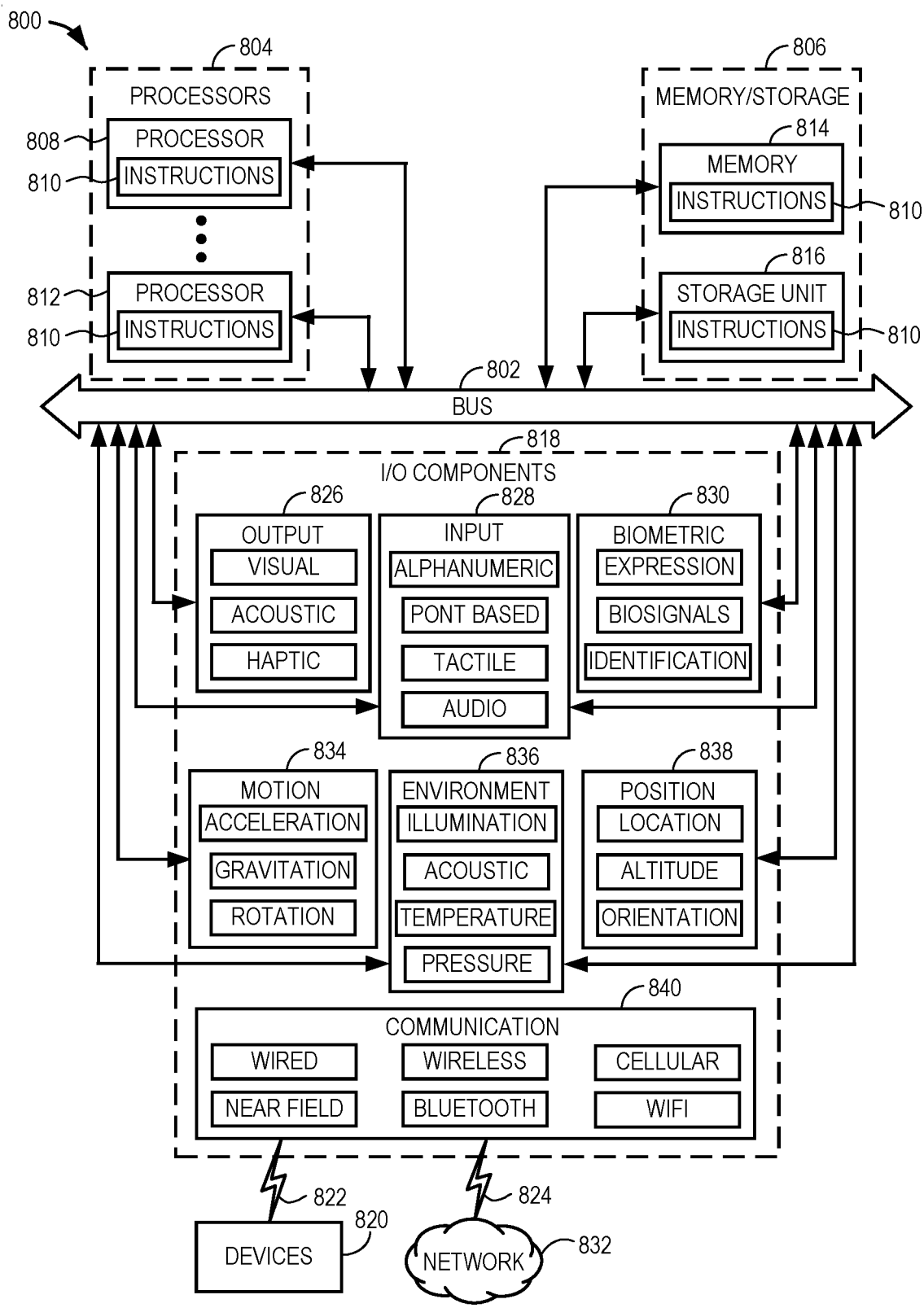
FIG. 8 is a block diagram illustrating components of a machine, according to some example embodiments, able to read instructions from a machine-readable medium (e.g., a machine-readable storage medium) and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 810 (e.g., software, a program, an application, an applet, an app, or other executable code) for causing the machine 800 to perform any one or more of the methodologies discussed herein may be executed. As such, the instructions 810 may be used to implement modules or components described herein. The instructions 810 transform the general, non-programmed machine 800 into a particular machine 800 programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 810, sequentially or otherwise, that specify actions to be taken by the machine 800. Further, while only a single machine 800 is illustrated, the term "machine" shall also be taken to include a collection of machines that individually or jointly execute the instructions 810 to perform any one or more of the methodologies discussed herein.

The machine 800 may include processors 804, 808, 812, memory/storage 806, and I/O components 818, which may be configured to communicate with each other such as via a bus 802. The memory/storage 806 may include a memory 814, such as a main memory, or other memory storage, and a storage unit 816, both accessible to the processors 804 such as via the bus 802. The storage unit 816 and memory 814 store the instructions 810 embodying any one or more of the methodologies or functions described herein. The instructions 810 may also reside, completely or partially, within the memory 814, within the storage unit 816, within at least one of the processors 804 (e.g., within the processor's cache memory), or any suitable combination thereof, during execution thereof by the machine 800. Accordingly, the memory 814, the storage unit 816, and the memory of the processors 804 are examples of machine-readable media.

The I/O components 818 may include a wide variety of components to receive input, provide output, produce output, transmit information, exchange information, capture measurements, and so on. The specific I/O components 818 that are included in a particular machine will depend on the type of machine. For example, portable machines such as mobile phones will likely include a touch input device or other such input mechanisms, while a headless server machine will likely not include such a touch input device. It will be appreciated that the I/O components 818 may include many other components that are not shown in FIG. 8. The I/O components 818 are grouped according to functionality merely for simplifying the following discussion, and the grouping is in no way limiting. In various example embodiments, the I/O components 818 may include output components 826 and input components 828. The output components 826 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 828 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 818 may include biometric components 830, motion components 834, environment components 836, or position components 838, among a wide array of other components. For example, the biometric components 830 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 834 may include acceleration sensor components (e.g., accelerometer), gravitation sensor components, rotation sensor components (e.g., gyroscope), and so forth. The environment components 836 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 838 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 818 may include communication components 840 operable to couple the machine 800 to a network 832 or devices 820 via a coupling 824 and a coupling 822, respectively. For example, the communication components 840 may include a network interface component or other suitable device to interface with the network 832. In further examples, the communication components 840 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 820 may be another machine or any of a wide variety of peripheral devices (e.g., a peripheral device coupled via a USB).

Moreover, the communication components 840 may detect identifiers or include components operable to detect identifiers. For example, the communication components 840 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 840, such as location via Internet Protocol (IP) geo-location, location via Wi-Fi® signal triangulation, location via detecting an NFC beacon signal that may indicate a particular location, and so forth.

Some embodiments include machine-readable media including instructions which, when read by a machine, cause the machine to perform the operations of any one or more of the methodologies summarized above, or described elsewhere herein.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, for reprocessing a payment after a first failed payment attempt via an electronic payment processing system, the method comprising:

obtaining training data, the training data comprising information about historical payment failures and retries via the electronic payment processing system, the training data further including a label for each retry attempt indicating whether the retry attempt was successful;

extracting one or more features from the training data; and passing the one or more features and the labels to a machine-learning algorithm, the machine-learning algorithm designed to cause a machine to train weights of a dunning model based on the training data, the training causing the dunning model to produce a dunning score indicative of a likelihood that a retry attempt at an input retry time point will result in a successful payment processing;

obtaining information about one or more failed payment attempts via the electronic payment processing system;

extracting one or more features from the information about the one or more failed payment attempts;

for each of a plurality of potential candidate retry time points, feeding the one or more features and the potential candidate retry time point into a dunning model to produce a dunning score;

using the dunning scores for the plurality of potential candidate retry time points to select a desired retry time point; and causing the electronic payment processing system to attempt to reprocess a payment associated with one of the failed payment attempts at a time matching the desired retry time point.

2. The method of claim 1, wherein the one or more failed payment attempts include at least two failed payment attempts and the features are extracted from information about all of the at least two failed payment attempts.

3. The method of claim 1, wherein the using the dunning scores for the plurality of potential candidate retry time points to select the desired retry time point comprises:

submitting the dunning scores for the plurality of potential candidate retry time points to an optimization function, the optimization function designed to identify a potential candidate retry time point having a maximum dunning score while minimizing a distance between the potential candidate retry time point and a predetermined time point selected based on a predetermined interval.

4. The method of claim 3, wherein the predetermined time point is determined by calculating a time difference between a predetermined last retry time point and a time for the first failed payment attempt, dividing the time difference by a predetermined number of remaining retry attempts, the dividing producing the predetermined interval, and then adding the predetermined interval to the time for the first failed payment attempt.

5. The method of claim 1, further comprising preprocessing the training data prior to the extracting the one or more features from the training data, the preprocessing comprising performing a map reduce operation on the training data.

6. The method of claim 1, wherein the machine-learning algorithm is a regression algorithm.

7. A system for handling a first failed payment attempt in an electronic payment processing system, the system comprising:

a network;

one or more hardware processors; and a memory storing instructions that, when executed by at least one processor among the processors, cause the system to perform operations comprising, at least:

obtaining training data, the training data comprising information about historical payment failures and retries via the electronic payment processing system, the training data further including a label for each retry attempt indicating whether the retry attempt was successful;

extracting one or more features from the training data; and passing the one or more features and the labels to a machine-learning algorithm, the machine-learning algorithm designed to cause a machine to train weights of a dunning model based on the training data, the training causing the dunning model to produce a dunning score indicative of a likelihood that a retry attempt at an input retry time point will result in a successful payment processing;

obtaining information about one or more failed payment attempts via the electronic payment processing system;

extracting one or more features from the information about the one or more failed payment attempts;

for each of a plurality of potential candidate retry time points, feeding the one or more features and the potential candidate retry time point into a dunning model to produce a dunning score;

using the dunning scores for the plurality of potential candidate retry time points to select a desired retry time point; and causing the electronic payment processing system to attempt to reprocess a payment associated with one of the failed payment attempts at a time matching the desired retry time point.

8. The system of claim 7, wherein the one or more failed payment attempts include at least two failed payment attempts and the features are extracted from information about all of the at least two failed payment attempts.

9. The system of claim 7, wherein the using the dunning scores for the plurality of potential candidate retry time points to select the desired retry time point comprises:

submitting the dunning scores for the plurality of potential candidate retry time points to an optimization function, the optimization function designed to identify a potential candidate retry time point having a maximum dunning score while minimizing a distance between the potential candidate retry time point and a predetermined time point selected based on a predetermined interval.

10. The system of claim 9, wherein the predetermined time point is determined by calculating a time difference between a predetermined last retry time point and a time for the first failed payment attempt, dividing the time difference by a predetermined number of remaining retry attempts, the dividing producing the predetermined interval, and then adding the predetermined interval to the time for the first failed payment attempt.

11. The system of claim 7, wherein the operations further comprise preprocessing the training data prior to the extracting the one or more features from the training data, the preprocessing comprising performing a map reduce operation on the training data.

12. The system of claim 7, wherein the machine-learning algorithm is a regression algorithm.

13. A non-transitory machine-readable medium comprising instructions which, when read by a machine, cause the machine to perform operations for handling a first failed payment attempt in an electronic payment processing system, the operations comprising:

obtaining training data, the training data comprising information about historical payment failures and retries via the electronic payment processing system, the training data further including a label for each retry attempt indicating whether the retry attempt was successful;

extracting one or more features from the training data; and passing the one or more features and the labels to a machine-learning algorithm, the machine-learning algorithm designed to cause a machine to train weights of a dunning model based on the training data, the training causing the dunning model to produce a dunning score indicative of a likelihood that a retry attempt at an input retry time point will result in a successful payment processing;

obtaining information about one or more failed payment attempts via the electronic payment processing system;

extracting one or more features from the information about the one or more failed payment attempts;

for each of a plurality of potential candidate retry time points, feeding the one or more features and the potential candidate retry time point into a dunning model to produce a dunning score;

using the dunning scores for the plurality of potential candidate retry time points to select a desired retry time point; and causing the electronic payment processing system to attempt to reprocess a payment associated with one of the failed payment attempts at a time matching the desired retry time point.

14. The non-transitory machine-readable medium of claim 13, wherein the one or more failed payment attempts include at least two failed payment attempts and the features are extracted from information about all of the at least two failed payment attempts.

15. The non-transitory machine-readable medium of claim 13, wherein the using the dunning scores for the plurality of potential candidate retry time points to select the desired retry time point comprises:

submitting the dunning scores for the plurality of potential candidate retry time points to an optimization function, the optimization function designed to identify a potential candidate retry time point having a maximum dunning score while minimizing a distance between the potential candidate retry time point and a predetermined time point selected based on a predetermined interval.

16. The non-transitory machine-readable medium of claim 15, wherein the predetermined time point is determined by calculating a time difference between a predetermined last retry time point and a time for the first failed payment attempt, dividing the time difference by a predetermined number of remaining retry attempts, the dividing producing the predetermined interval, and then adding the predetermined interval to the time for the first failed payment attempt.

17. The non-transitory machine-readable medium of claim 13, wherein the operations further comprise preprocessing the training data prior to the extracting the one or more features from the training data, the preprocessing comprising performing a map reduce operation on the training data.

* * * * *